(12) United States Patent
Islam

(10) Patent No.: US 11,579,393 B2
(45) Date of Patent: Feb. 14, 2023

(54) FIBER OPTIC CABLE BREAKOUT ASSEMBLY

(71) Applicant: CommScope Technologies LLC, Hickory, NC (US)

(72) Inventor: Nahid Islam, Westmont, IL (US)

(73) Assignee: CommScope Technologies LLC, Hickory, NC (US)

( * ) Notice: Subject to any disclaimer, the term of this patent is extended or adjusted under 35 U.S.C. 154(b) by 7 days.

(21) Appl. No.: 17/202,846

(22) Filed: Mar. 16, 2021

(65) Prior Publication Data

US 2021/0325623 A1    Oct. 21, 2021

Related U.S. Application Data

(60) Provisional application No. 63/010,149, filed on Apr. 15, 2020.

(51) Int. Cl.
 G02B 6/44  (2006.01)
 G02B 6/255 (2006.01)

(52) U.S. Cl.
 CPC ......... G02B 6/4472 (2013.01); G02B 6/2558 (2013.01)

(58) Field of Classification Search
 None
 See application file for complete search history.

(56) References Cited

U.S. PATENT DOCUMENTS

| | | | |
|---|---|---|---|
| 8,737,786 B1* | 5/2014 | Compton | G02B 6/4472 385/100 |
| 10,247,899 B2* | 4/2019 | Islam | G02B 6/4472 |
| 2016/0139355 A1* | 5/2016 | Petersen | G02B 6/4472 385/100 |
| 2018/0061528 A1* | 3/2018 | Islam | G02B 6/4416 |
| 2018/0156975 A1* | 6/2018 | Seri | G02B 6/2558 |
| 2019/0140402 A1* | 5/2019 | Islam | H04W 52/00 |
| 2019/0293892 A1* | 9/2019 | Wentworth | G02B 6/4495 |
| 2022/0026658 A1* | 1/2022 | Gajek | G02B 6/4471 |

* cited by examiner

*Primary Examiner* — Jerry Rahll
(74) *Attorney, Agent, or Firm* — Myers Bigel, P.A.

(57) ABSTRACT

A fiber optic cable breakout assembly includes: a fiber optic cable including a plurality of first optical fibers and a first jacket surrounding the optical fibers; a breakout canister; a plurality of pigtail cords, each of the pigtail cords including a second optical fiber partially encased in a second jacket and an optical connector, each of the pigtail cords extending away from the canister, each of the optical fibers extending through the canister; and a flexible furcation tube attached to and extending between the fiber optic cable and the breakout canister, the furcation tube including an armored inner layer and a polymeric outer layer, wherein each of the first optical fibers is spliced to a respective second optical fiber within the inner layer of the furcation tube.

20 Claims, 4 Drawing Sheets

FIBER OPTIC CABLE BREAKOUT ASSEMBLY

RELATED APPLICATION

The present application claims priority from and the benefit of U.S. Provisional Patent Application No. 63/010,149, filed Apr. 15, 2020, the disclosure of which is hereby incorporated by reference herein in full.

FIELD OF THE INVENTION

The present invention relates generally to spliced cable and/or spliced optical fiber protectors and cable assemblies.

BACKGROUND

Optical fibers of fiber optic cables (either individual fibers or groups of fibers, such as ribbon fibers) are often spliced together to enable the transmission of signals between two cables. Fusion splicing is the process of fusing or welding two fibers together, usually by an electric arc. Fusion splicing is the most widely used method for splicing optical fibers and fiber optic cables, as it typically provides the lowest loss and least reflectance, as well as providing the strongest and most reliable joint between two fibers.

It may be desirable to provide techniques for enhancing fusion splicing operations, particularly in the field or in a warehouse.

SUMMARY

As a first aspect, embodiments of the invention are directed to a fiber optic cable breakout assembly. The assembly comprises: a fiber optic cable including a plurality of first optical fibers and a first jacket surrounding the optical fibers; a breakout canister; a plurality of pigtail cords, each of the pigtail cords including a second optical fiber partially encased in a second jacket and an optical connector, each of the pigtail cords extending away from the canister, each of the optical fibers extending through the canister; and a flexible furcation tube attached to and extending between the fiber optic cable and the breakout canister, the furcation tube including an armored inner layer and a polymeric outer layer, wherein each of the first optical fibers is spliced to a respective second optical fiber within the inner layer of the furcation tube.

As a second aspect, embodiments of the invention are directed to a fiber optic cable breakout assembly comprising: a fiber optic cable including a plurality of first optical fibers and a first jacket surrounding the optical fibers; a breakout canister; a plurality of pigtail cords, each of the pigtail cords including a second optical fiber partially encased in a second jacket and an optical connector, each of the pigtail cords extending away from the canister, each of the optical fibers extending through the canister; a flexible furcation tube attached to and extending between the fiber optic cable and the breakout canister, the furcation tube including a corrugated armored inner layer, a middle layer comprising strength members, and a polymeric outer layer, wherein each of the first optical fibers is spliced to a respective second optical fiber within the inner layer of the furcation tube; and a first transition sleeve overlying an end of the first jacket, a first exposed portion of the middle layer, and the outer layer at a first end of the furcation tube, and a second transition sleeve overlying the outer layer of a second end of the furcation tube, a second exposed portion of the middle layer, and a portion of the canister.

As a third aspect, embodiments of the invention are directed to a fiber optic cable breakout assembly comprising: a fiber optic cable including a plurality of first optical fibers in the form of a ribbon and a first jacket surrounding the optical fibers; a breakout canister; a plurality of pigtail cords, each of the pigtail cords including a second optical fiber partially encased in a second jacket and an optical connector, each of the pigtail cords extending away from the canister, each of the optical fibers extending through the canister; and a flexible furcation tube attached to and extending between the fiber optic cable and the breakout canister, the furcation tube including a corrugated armored inner layer and a polymeric outer layer, wherein each of the first optical fibers is spliced to a respective second optical fiber within the inner layer of the furcation tub, the splices surrounded by a splice protector.

DETAILED DESCRIPTION

Figure 1:
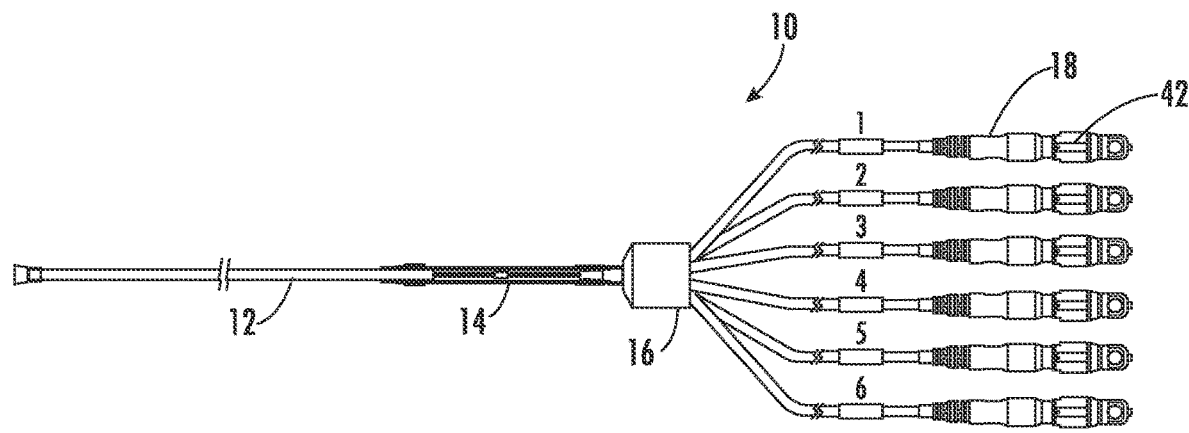
FIG. 1 is a schematic section view of a fiber optic cable assembly according to embodiments of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now will be described more fully hereinafter with reference to the accompanying drawings, in which illustrative embodiments of the invention are shown. Like numbers refer to like elements throughout and different embodiments of like elements can be designated using a different number of superscript indicator apostrophes (e.g., 10', 10", 10''').

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Referring now to FIG. 1, a fiber optic cable assembly, designated broadly at 10, is shown therein. The assembly 10 includes a fiber optic cable 12, a furcation tube 14, a breakout canister 16, and a plurality of "pigtail" cords 18. These are discussed in more detail below.

Referring to FIGS. 1-4 the fiber optic cable 12 is elongate and includes a plurality of optical fibers 21, which may be formed as a ribbon. A cable jacket 22 (which may include armor) surrounds the optical fibers 21. The fiber optic cable 12 may be of any conventional configuration, and may include any number of optical fibers.

Figure 2:
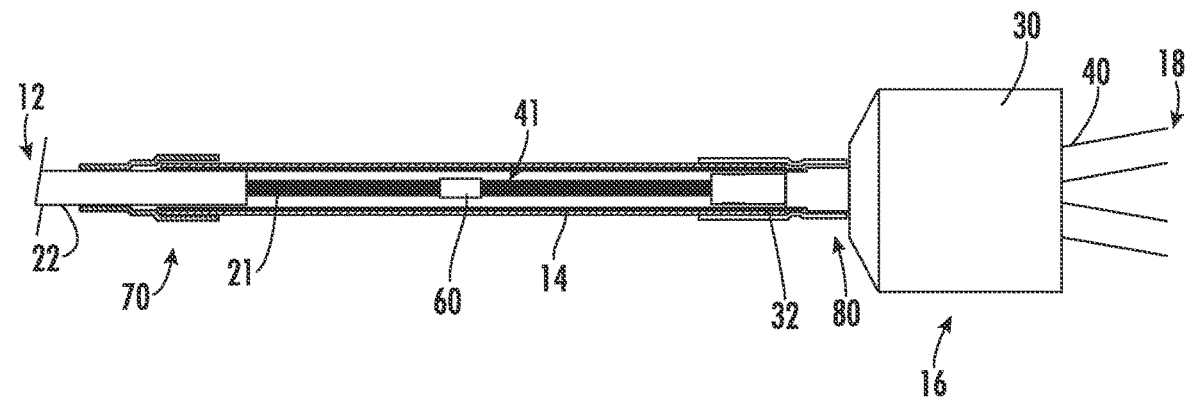
FIG. 2 is an enlarged partial schematic section view of the cable assembly of FIG. 1.
Figure 4:
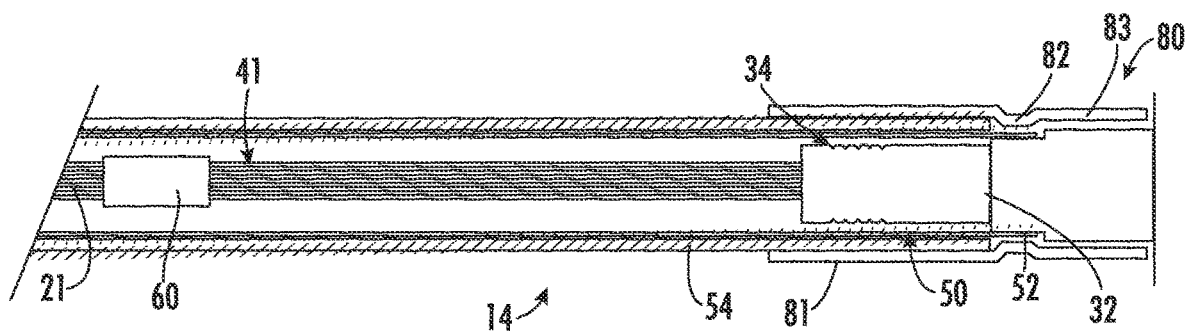
FIG. 4 is an enlarged partial schematic section view of the pigtail end of the cable assembly of FIG. 1.
Figure 7:
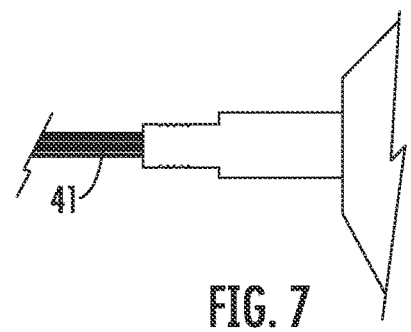
FIG. 7 is a greatly enlarged view of the collar of the canister shown in FIG. 6.

Referring to FIGS. 2, 4 and 7, the canister 16 is generally cylindrical, with a main housing 30 and a narrower neck 32 extending therefrom. The neck 32 may include threads 34 or similar indentations. The main housing 30 may be open or closed at the opposite end; if open, it may be filled with a potting compound or the like. The canister 16, which may take other shapes, including those in which the ends are of different shapes, is typically formed of a polymeric material.

Referring now to FIGS. 1, 2, 4 and 6, the pigtail cords 18 extend from the larger end of the canister 16. Each of the pigtail cords 18 includes at least one optical fiber 41 therein covered by a jacket 40 (the jackets 40 are visible in FIG. 1). An optical connector 42 is attached at the free end of each of the pigtail cords 18.

Figure 8:
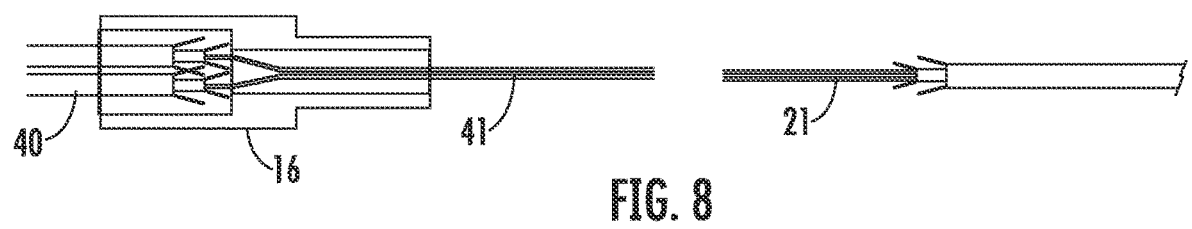
FIG. 8 is a schematic view of the cable assembly of FIG. 1 showing the canister in section view to illustrate the breakout of optical fibers.

As shown schematically in FIG. 8, the canister 16 serves as a protective structure in which the individual optical fibers 41 are separated from each other (i.e., "broken out" from each other) and receive their respective jackets 40 or other protective structures. The pigtail cords 18 with their jackets 40 exit the wider end of the canister 16 and extend therefrom, with their connectors 42, for subsequent connection with mating optical connectors. Further details regarding the canister 16 and pigtail cords 18 are set forth in U.S. Pat. No. 10,247,899 to Islam, the disclosure of which is hereby incorporated herein by reference in full.

Figure 3:
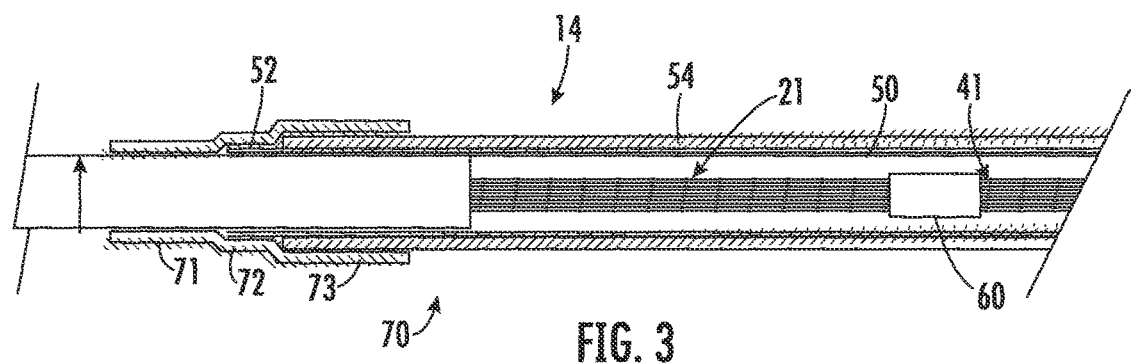
FIG. 3 is an enlarged partial schematic section view of the cable end of the cable assembly of FIG. 1.
Figure 5:
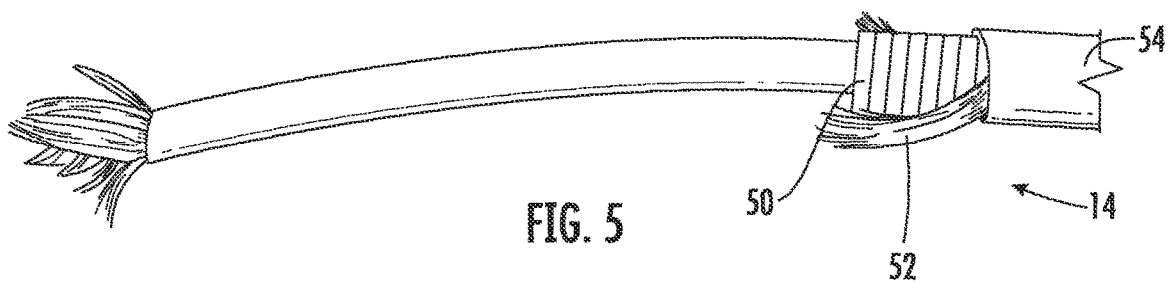
FIG. 5 is a top, partial cutaway view of the furcation tube of the cable assembly of FIG. 1.
Figure 6:
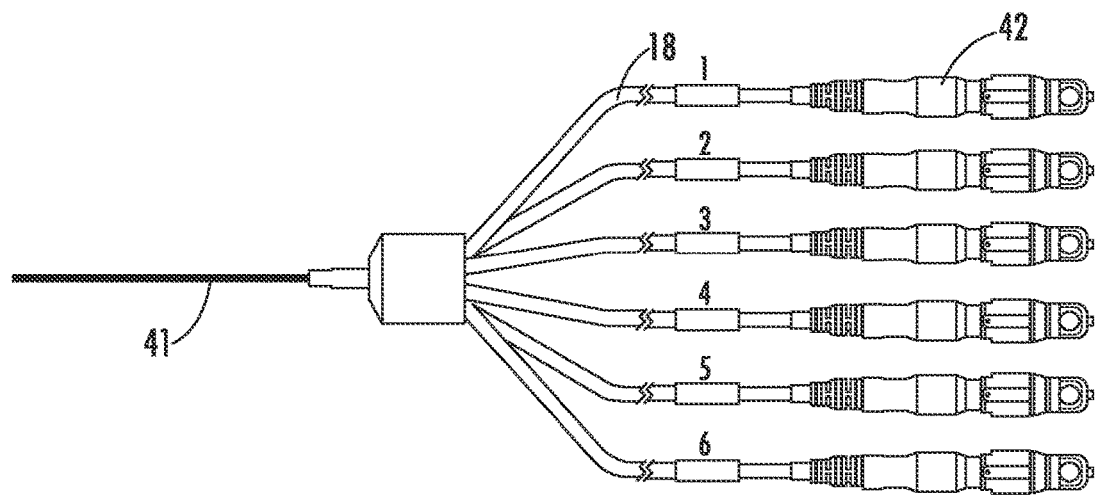
FIG. 6 is a partial schematic view of the pigtails and breakout canister of the cable assembly of FIG. 1.

Referring now to FIGS. 2-5, the furcation tube 14 is shown therein. As best seen in FIG. 5, the furcation tube 14 is a hollow, elongate cylinder with multiple layers. The inner layer 50 is an armored layer, typically formed of a metal (such as helical stainless steel, annular interlocking aluminum or copper, corrugated or helical or annular copper or aluminum or helical PVC armor), that may be helically or annularly corrugated to encourage flexibility. The middle layer 52 comprises strength members formed of materials such as aramid fiber, KEVLAR®, glass fiber, or the like. The outer layer 54 comprises a flexible jacket, typically formed of a rubber or polymeric material such as PVC, polyethylene or polyurethane. As can be seen in FIGS. 3 and 4, at the ends, the strength members of the middle layer 52 extend longitudinally farther than the inner layer 50 and the outer layer 54. The materials of the various layers of the furcation tube 14 are typically selected so that the furcation tube 14 is relatively flexible.

It can be seen in FIG. 2 that the optical fibers 21 of the fiber optic cable 12 extend from the cable jacket 22 into the furcation tube 14, and that the optical fibers 41 of the pigtail cords 18 extend through the canister 16 into the opposite end of the furcation tube 14. The optical fibers 21 and optical fibers 41 are spliced, wherein the splice sites are positioned within the furcation tube 14. In the illustrated embodiment, a splice protector 60 is employed to protect the spliced optical fibers 21, 41, although in other embodiments the splice sites may be protected with an overmolded protector, a potting compound or the like.

As shown in FIGS. 2 and 3, at the cable end of the furcation tube 14, a three-part transition sleeve 70 overlies the cable jacket 22 and the furcation tube 14. The narrow end 71 of the transition sleeve 70 overlies the cable jacket 22. The intermediate portion 72 of the transition sleeve 70 overlies the strength members of the inner layer 52 of the furcation tube 14. The intermediate portion 72 is attached to the inner layer 52, typically via an adhesive or crimping. The wider end 73 of the transition sleeve 70 overlies the outer layer 54 of the furcation tube 14 and is attached thereto. In some embodiments, the transition sleeve 70 may comprise a heat shrink sleeve that can be shrink into place over the aforementioned jacket 22, middle layer 52 and outer layer 54. In other embodiments, the transition sleeve 70 may be formed in place via overmolding.

Referring now to FIGS. 2 and 4, a second transition sleeve 80 is shown therein. The transition sleeve 80 has a first section 81 that overlies the outer layer 54 of the furcation tube 14, a second section 82 that overlies the exposed strength members of the middle layer 52, and a third section 83 that overlies the neck 32 of the canister 16. As described above in connection with the transition sleeve 70, the different sections of the transition sleeve 80 may be attached to their respective underlying structures via various techniques, such as adhesive or crimping. Also, as described above, the transition sleeve 80 may comprise a heat shrink sleeve or an overmolded component.

It can be seen in FIGS. 1 and 2 that the cable 12 and furcation tube 14 are relatively narrow, with the furcation tube 14 and the transition sleeves 70, 80 being only slightly larger in diameter than the cable 12 (typically between about 10 to 30 percent greater in diameter than the cable 12). As such, the portion of the assembly 10 between the cable 12 and the canister 16 somewhat resembles in appearance and size the cable itself. Also, it is notable that the flexibility of the furcation tube 14 helps this portion of the assembly 10 to "feel" like the cable 12. However, the armored inner layer 50 of the furcation tube 14 can provide protection for the spliced optical fibers 21, 41.

Those of skill in this art will appreciate that the assembly may take other forms. For example, although ribbonized optical fibers are shown herein, the optical fibers may take another form. The canister 16 may be open at the connector end, or may have a cover. In some embodiments numbers of optical fibers may vary. The furcation tube 14 may lack a middle layer of strength members.

Figure 9:
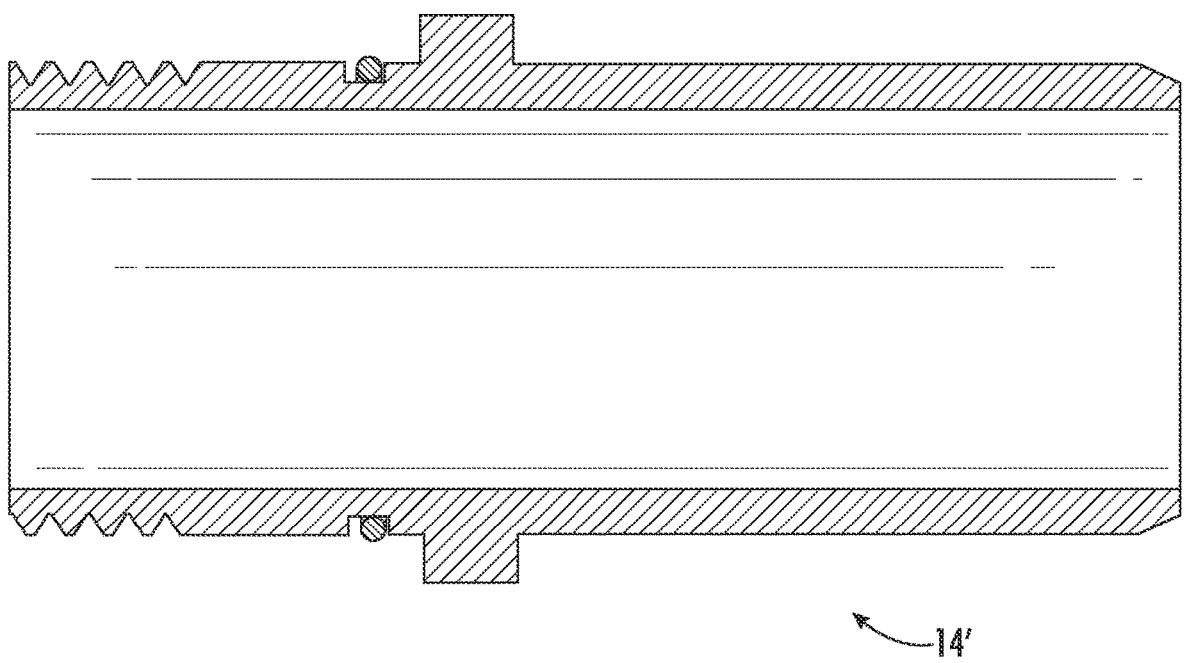
FIG. 9 is a side section view of a furcation tube according to alternative embodiments of the invention.

As another example, the furcation tube may be sized to reside radially inside, rather than outside, the neck 34, and may be threaded, crimped, clamped or bonded thereto. FIG. 9 illustrates an alternative furcation tube 14' of such a configuration. If threaded, the threads may be provided via a molded or bonded insert or may be formed directly into the furcation tube. Also, with a threaded version one or more O-rings may be present.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A fiber optic cable breakout assembly, comprising:
   a fiber optic cable including a plurality of first optical fibers and a first jacket surrounding the optical fibers;
   a breakout canister;
   a plurality of pigtail cords, each of the pigtail cords including a second optical fiber partially encased in a second jacket and an optical connector, each of the pigtail cords extending away from the canister, each of the second optical fibers extending through the canister; and
   a flexible furcation tube attached to and extending between the fiber optic cable and the breakout canister, the furcation tube including an armored inner layer and a polymeric outer layer, wherein each of the first optical fibers is spliced to a respective second optical fiber within the inner layer of the furcation tube.

2. The fiber optic cable breakout assembly defined in claim 1, wherein the furcation tube includes a middle layer disposed between the inner and outer layers, the middle layer comprising strength members.

3. The fiber optic cable breakout assembly defined in claim 1, further comprising a first transition sleeve overlying an end of the first jacket and the outer layer at a first end of the furcation tube, and a second transition sleeve overlying the outer layer of a second end of the furcation tube and a portion of the canister.

4. The fiber optic cable breakout assembly defined in claim 3, wherein the first and second transition sleeves comprise heat shrink sleeves.

5. The fiber optic cable breakout assembly defined in claim 3, wherein the first and second transition sleeves comprise overmolded components.

6. The fiber optic cable breakout assembly defined in claim 3, wherein the portion of the canister overlaid by the second transition sleeve comprises a neck.

7. The fiber optic cable breakout assembly defined in claim 1, wherein splices between the first and second optical fibers are surrounded by a splice protector within the furcation tube.

8. The fiber optic cable breakout assembly defined in claim 1, wherein the first optical fibers are in the form of a ribbon.

9. A fiber optic cable breakout assembly, comprising:
   a fiber optic cable including a plurality of first optical fibers and a first jacket surrounding the optical fibers;
   a breakout canister;
   a plurality of pigtail cords, each of the pigtail cords including a second optical fiber partially encased in a second jacket and an optical connector, each of the pigtail cords extending away from the canister, each of the second optical fibers extending through the canister;
   a flexible furcation tube attached to and extending between the fiber optic cable and the breakout canister, the furcation tube including a corrugated armored inner layer, a middle layer comprising strength members, and a polymeric outer layer, wherein each of the first optical fibers is spliced to a respective second optical fiber within the inner layer of the furcation tube; and
   a first transition sleeve overlying an end of the first jacket, a first exposed portion of the middle layer, and the outer layer at a first end of the furcation tube, and a second transition sleeve overlying the outer layer of a second end of the furcation tube, a second exposed portion of the middle layer, and a portion of the canister.

10. The fiber optic cable breakout assembly defined in claim 9, wherein the first and second transition sleeves comprise heat shrink sleeves.

11. The fiber optic cable breakout assembly defined in claim 9, wherein the first and second transition sleeves comprise overmolded components.

12. The fiber optic cable breakout assembly defined in claim 9, wherein the portion of the canister overlaid by the second transition sleeve comprises a neck.

13. The fiber optic cable breakout assembly defined in claim 9, wherein splices between the first and second optical fibers are surrounded by a splice protector within the furcation tube.

14. The fiber optic cable breakout assembly defined in claim 9, wherein the first optical fibers are in the form of a ribbon.

15. A fiber optic cable breakout assembly, comprising:
   a fiber optic cable including a plurality of first optical fibers in the form of a ribbon and a first jacket surrounding the optical fibers;
   a breakout canister;
   a plurality of pigtail cords, each of the pigtail cords including a second optical fiber partially encased in a second jacket and an optical connector, each of the pigtail cords extending away from the canister, each of the second optical fibers extending through the canister; and a flexible furcation tube attached to and extending between the fiber optic cable and the breakout canister, the furcation tube including a corrugated armored inner layer and a polymeric outer layer, Wherein each of the first optical fibers is spliced to a respective second optical fiber within the inner layer of the furcation tub, the splices surrounded by a splice protector.

16. The fiber optic cable breakout assembly defined in claim 15, wherein the furcation tube includes a middle layer disposed between the inner and outer layers, the middle layer comprising strength members.

17. The fiber optic cable breakout assembly defined in claim 15, further comprising a first transition sleeve overlying an end of the first jacket and the outer layer at a first end of the furcation tube, and a second transition sleeve overlying the outer layer of a second end of the furcation tube and a portion of the canister.

18. The fiber optic cable breakout assembly defined in claim 17, wherein the first and second transition sleeves comprise heat shrink sleeves.

19. The fiber optic cable breakout assembly defined in claim 17, wherein the first and second transition sleeves comprise overmolded components.

20. The fiber optic cable breakout assembly defined in claim 17, wherein the portion of the canister overlaid by the second transition sleeve comprises a neck.

\* \* \* \* \*